(12) United States Patent
Killey

(10) Patent No.: US 10,139,276 B2
(45) Date of Patent: Nov. 27, 2018

(54) HYPERSPECTRAL IMAGING OF A MOVING SCENE

(71) Applicant: BAE SYSTEMS plc, London (GB)

(72) Inventor: Ainsley Killey, Bristol (GB)

(73) Assignee: BAE SYSTEMS plc, London (GB)

( * ) Notice: Subject to any disclaimer, the term of this patent is extended or adjusted under 35 U.S.C. 154(b) by 385 days.

(21) Appl. No.: 14/433,499

(22) PCT Filed: Sep. 25, 2013

(86) PCT No.: PCT/GB2013/052503
§ 371 (c)(1),
(2) Date: Apr. 3, 2015

(87) PCT Pub. No.: WO2014/057242
PCT Pub. Date: Apr. 17, 2014

(65) Prior Publication Data
US 2015/0253188 A1 Sep. 10, 2015

(30) Foreign Application Priority Data

Oct. 8, 2012 (GB) .................................. 1217997.4

(51) Int. Cl.
*G01J 3/02* (2006.01)
*G01J 3/28* (2006.01)
(Continued)

(52) U.S. Cl.
CPC ........... *G01J 3/0278* (2013.01); *G01J 3/0237* (2013.01); *G01J 3/2823* (2013.01);
(Continued)

(58) Field of Classification Search
None
See application file for complete search history.

(56) References Cited

U.S. PATENT DOCUMENTS 6,008,492 A 12/1999 Slater et al.
6,958,466 B1 10/2005 Stein
(Continued)

FOREIGN PATENT DOCUMENTS

EP 2365463 A1 9/2011
WO 03001346 A2 1/2003
(Continued)

OTHER PUBLICATIONS

U.S. Appl. No. 14/430,089, filed Mar. 20, 2015.
(Continued)

*Primary Examiner* — Jayanti K Patel
*Assistant Examiner* — Shadan E Haghani
(74) *Attorney, Agent, or Firm* — Finch & Maloney PLLC

(57) ABSTRACT

An apparatus and method are disclosed for hyperspectral imaging of a scene along an imaging path, from a viewpoint which is arranged to move relative to the scene. The method comprises acquiring hyperspectral image data of a portion of the scene from the viewpoint, along a first viewing direction relative to the viewpoint and redirecting the viewing direction from the first viewing direction to a second viewing direction relative to the viewpoint, in dependence of the relative movement, to maintain a view of said portion of the scene as the viewpoint moves along a portion of the imaging path.

12 Claims, 3 Drawing Sheets

(51) Int. Cl.
*H04N 5/225* (2006.01)
*H04N 5/33* (2006.01)
(52) U.S. Cl.
CPC ........... *H04N 5/2254* (2013.01); *H04N 5/332* (2013.01); *G01J 2003/2826* (2013.01)

(56) References Cited

U.S. PATENT DOCUMENTS

| | | | |
|---|---|---|---|
| 7,194,111 | B1 | 3/2007 | Schaum et al. |
| 7,425,693 | B2 | 9/2008 | Shapira |
| 8,174,694 | B2* | 5/2012 | Bodkin ............... G01J 3/02 356/328 |
| 8,854,255 | B1 | 10/2014 | Ehret |
| 2002/0193971 | A1 | 12/2002 | Whitsitt et al. |
| 2004/0151350 | A1 | 8/2004 | Tafuku et al. |
| 2004/0210391 | A1 | 10/2004 | Kolodner et al. |
| 2005/0177307 | A1* | 8/2005 | Greenfeld ............... F41G 5/14 701/409 |
| 2006/0017816 | A1 | 1/2006 | Gat |
| 2007/0080851 | A1 | 4/2007 | Shapira |
| 2007/0129853 | A1* | 6/2007 | Greenfeld ............ G01C 11/02 701/3 |
| 2008/0112029 | A1 | 5/2008 | Bodkin |
| 2009/0232361 | A1 | 9/2009 | Miller |
| 2010/0090845 | A1 | 4/2010 | Polak et al. |
| 2010/0235095 | A1* | 9/2010 | Smitherman ......... G01C 11/02 701/532 |
| 2010/0283988 | A1 | 11/2010 | Mosier et al. |
| 2010/0322480 | A1 | 12/2010 | Banerjee et al. |
| 2010/0329512 | A1 | 12/2010 | Nam et al. |
| 2011/0037639 | A1 | 2/2011 | Duran Toro et al. |
| 2011/0279682 | A1 | 11/2011 | Li et al. |
| 2011/0311142 | A1 | 12/2011 | Robles-Kelly et al. |
| 2013/0050011 | A1 | 2/2013 | Kim |
| 2013/0142500 | A1* | 6/2013 | Yavin ................... G01C 11/025 396/7 |
| 2013/0188065 | A1 | 7/2013 | Wegener |
| 2013/0236073 | A1 | 9/2013 | Piratla et al. |
| 2013/0272626 | A1 | 10/2013 | Robinson |
| 2013/0300910 | A1 | 11/2013 | Levoy et al. |
| 2014/0049661 | A1* | 2/2014 | Leung .................. G06T 3/4053 348/222.1 |
| 2014/0050406 | A1 | 2/2014 | Buehler et al. |
| 2015/0235072 | A1 | 8/2015 | Killey et al. |
| 2015/0235102 | A1 | 8/2015 | Blagg |
| 2015/0241563 | A1 | 8/2015 | Veiga et al. |

FOREIGN PATENT DOCUMENTS

| | | |
|---|---|---|
| WO | 2014045012 A1 | 3/2014 |
| WO | 2014045013 A1 | 3/2014 |
| WO | 2014053828 A1 | 4/2014 |
| WO | 2014057242 A1 | 4/2014 |

OTHER PUBLICATIONS

U.S. Appl. No. 14/433,474, filed Apr. 3, 2015.
U.S. Appl. No. 14/430,088, filed Mar. 20, 2015.
International Preliminary Report on Patentability and Written Opinion received for Patent Application No. PCT/GB2013/052503, dated Apr. 16, 2015. 7 pages.
International Preliminary Report on Patentability and Written Opinion received for Patent Application No. PCT/GB2013/052561, dated Apr. 16, 2015. 6 pages.
International Search Report and Written Opinion received for Patent Application No. PCT/GB2013/052387, dated Feb. 28, 2014. 9 pages.
GB Intellectual Property Office Search Report under Section 17(5) received for GB Patent Application No. 1216818.3, dated Dec. 20, 2012. 3 pages.
GB Intellectual Property Office Search Report under Section 17(5) received for GB Patent Application No. 1217999.0, dated Apr. 12, 2013. 4 pages.
International Search Report and Written Opinion received for Patent Application No. PCT/GB2013/052561, dated Feb. 11, 2014. 9 pages.
GB Intellectual Property Office Search Report under Section 17(5) received for GB Patent Application No. 1217862.0 dated Apr. 8, 2013. 4 pages.
International Search Report and Written Opinion received for Patent Application No. PCT/GB2013/052388, dated Dec. 16, 2013. 12 pages.
GB Intellectual Property Office Combined Search and Examination Report under Section 17 and 18(3) received for GB Patent Application No. 1312921.8, dated Nov. 22, 2013. 8 pages.
Johnson, et al., "A compact, active hyperspectral imaging system for the detection of concealed targets," Part of the SPIE Conference on Detection and Remediation Technologies for Mines and Minelike Targets IV, Proceedings of SPIE, vol. 3710, Apr. 1999. pp. 144-153.
Manolakis, et al., "Detection Algorithms for Hyperspectral Imaging Applications," Lincoln Laboratory, Massachusetts Institute of Technology, Feb. 7, 2002. 85 pages.
Anonymous: "Algorithms for calculating variance—Wikipedia, the free encyclopedia." Sep. 28, 2012. Retrieved from the Internet on Jan. 28 2014 at URL: http://en.wikipedia.org/w/index.php?title=Algorithms_for_calculating_variance&oldid=515040024.
Gorelnik, et al., "Anomaly Detection in Non-Stationary Backgrounds," 2010, IEEE, 2nd Workshop on Hyperspectral Image and Signal Processing: Evolution in Remote Sensing (Whispers). pp. 1-4.
Messinger, et al., "Improving Background Multivariate Normality and Target Detection Performance Using Spatial and Spectral Segmentation," Geoscience and Remote Sensing Symposium, 2006, IEEE. pp. 371-374.
Bachega, et al., "Evaluating and Improving Local Hyperspectral Anomaly Detectors," Applied Imagery Pattern Recognition Workshop (AIPR), 2011 IEEE. pp. 1-8.
Pieper, et al., "Performance Evaluation of Cluster-Based Hyperspectral Target Detection Algorithms," 19th IEEE International Conference on Image Processing (ICIP), 2012. pp. 2669-2672.
Bishop, et al., "Spectral Tracking of Objects in Real Time," Proceedings of SPIE, vol. 7119, Oct. 2, 2008. pp. 71190D-1 through 71190D-14.
Adler-Golden, et al., "Automation of Rare Target Detection Via Adaptive Fusion," Spectral Sciences, Inc., Burlington, MA. 01803-3304, IEEE, Jun. 6, 2011. pp. 1-4.
Ettenberg, Martin H., "A Little Night Vision InGaAs shortwave infrared emerges as key complement to IR for military imaging," URL: http://www.advancedimagingpro.com/online/printer.jsp?id=696. Posted: Jul. 8, 2009 5:26 PM CDT. 5 pages.
Blagg, "People detection using fused hyperspectral and thermal imagery," Proceedings of SPIE, vol. 8542. Electro-Optical Remote Sensing, Photonic Technologies, and Applications VI, Nov. 19, 2012, pp. 854221-1 to 854221-7.
Blagg, et al., "Temporal performance of spectral matched filtering techniques," Proceedings of SPIE, vol. 6741. Optics and Photonics for Counterterrorism and Crime Fighting, III. Oct. 8, 2007, pp. 67410U01 to 67410U-10.
International Preliminary Report on Patentability and Written Opinion received for Application No. PCT/GB2013/052388, dated Apr. 2, 2015. 8 pages.
International Preliminary Report on Patentability and Written Opinion received for Application No. PCT/GB2013/052387, dated Apr. 2, 2015. 6 pages.
International Search Report and Written Opinion received for Patent Application No. PCT/GB2013/052503, dated Dec. 13, 2013. 10 pages.
GB Intellectual Property Office Search Report under Section 17(5) received for GB Patent Application No. 1217997.4 dated Jan. 10, 2013. 3 pages.
Puckrin, et al., "Airborne Infrared Hyperspectral Mapping for Detection of Gaseous and Solid Targets," Proceedings of Global Geospatial Conference, May 14-17, 2012, Quebec City, Canada. 13 pages.

(56) References Cited

OTHER PUBLICATIONS

Allard, et al., "Airborne measurements in the longwave infrared using an imaging hyperspectral sensor," SPIE Proceedings, vol. 6954, Chemical, Biological, Radiological, Nuclear, and Explosives (CBRNE) Sensing IX, Apr. 17, 2008. 12 pages.

Puckrin, et al., "Airborne measurements in the infrared using FTIR-based imaging hyperspectral sensors," SPIE, vol. 7324-46, Orlando, Apr. 13-17, 2009. 12 pages.

Pieper, M.L. et al., "Hyperspectral Detection and Discrimination Using the ACE Algorithm", Proc. of SPIE, 2011, 13 pages, vol. 8158.

B. Johnson et al., "A Compact, Active Hyperspectral Imaging System for the Detection of Concealed Targets", Proceedings of SPIE—The International Society for Optical Engineering, Aug. 1999, 11 pages.

\* cited by examiner

HYPERSPECTRAL IMAGING OF A MOVING SCENE

FIELD OF THE DISCLOSURE

The present invention relates to a method and apparatus for hyperspectral imaging of a moving scene and particularly to imaging along an imaging path, from a viewpoint which is arranged to move relative to the scene.

BACKGROUND

Hyperspectral imaging sensors typically only register one thin line of an image at a time. The image is built up by scanning the sensor across the scene, e.g. using a motorised stage or using the motion of an aircraft to scan across the landscape (push broom scanning).

When incorporated with aircraft, push broom hyperspectral images are gathered using the forward motion of the aircraft to scan an image sensor across the ground in a swath direction, which is typically perpendicular to the forward motion (track direction). A slit and objective lens is used to project an image of a narrow line on the ground through a wavelength dispersive spectrometer. The geometry is arranged so that the images successively projected are spatial in one direction and spectral in the other.

The spatial resolution of aerial push broom hyperspectral images in the swath direction is determined by the characteristics of the lens optics and camera used. The spatial resolution in the track direction is determined by the speed and height of the aircraft. To create the highest quality imagery for subsequent analysis it is normal to match these two resolutions so that the pixels on the hyperspectral images are "square".

Spectral resolution is principally determined by the extent of the dispersion produced by the spectrometer compared to the size of the sensor in the track direction. Hence to create well resolved images it is preferable to fly as low and as slowly as practically possible.

Military surveillance aircraft cannot generally fly much lower than about 3 km because of the threat from small arms fire and remotely piloted grenades. The stall speed of these types of aircraft is usually not less than about 45 m/s (~90 knots). In practice this puts a lower limit on the angular rate of scan of about 15 mrad/s (0.86 deg/s). For a frame rate of 50 Hz, this is 0.3 mrad (0.017 deg), or 0.9 m from 3 km, and as such presents a limit to the spatial resolution attainable.

SUMMARY

According to a first aspect of the present invention, there is provided a method for hyperspectral imaging of a scene along an imaging path, from a viewpoint which is arranged to move relative to the scene, the method comprising:
  acquiring hyperspectral image data of a portion of the scene from the viewpoint, along a first viewing direction relative to the viewpoint;
  redirecting the viewing direction from the first viewing direction to a second viewing direction relative to the viewpoint, in dependence of the relative movement, to maintain a view of said portion of the scene as the viewpoint moves along a portion of the imaging path.

Advantageously, the method provides for an increased spatial resolution of the scene by reducing the relative speed between the portion of the scene being viewed and the viewpoint, such as the aircraft, by tracking the location of the portion of the scene as the aircraft moves overhead.

The method preferably further comprises redirecting the viewing direction from the second viewing direction to the first viewing direction, for subsequent acquisition of further hyperspectral image data of a further portion of the scene from the viewpoint. In an embodiment, the method is arranged to acquire hyperspectral image data of a scene from an aerial position, for example using a hyperspectral sensor mounted upon an aircraft. In this respect, the first viewing direction is a forwardly direction relative to the aircraft and the second direction may be a less forwardly direction, or even a rearward direction.

The hyperspectral image data is preferably acquired via a reflecting member, which is arranged to reflect an image of the portion of the scene onto a hyperspectral sensor. The viewing direction may be varied between the first and second viewing directions by rotating the reflecting member between first and second angular orientations, respectively.

According to a second aspect of the present invention, there is provided apparatus for hyperspectral imaging of a scene along an imaging path, from a viewpoint which is arranged to move relative to the scene, the apparatus comprising:
  a hyperspectral imaging sensor for acquiring hyperspectral image data
  an image steering arrangement for steering a view of a portion of the scene from a first viewing direction to a second viewing direction relative to the viewpoint, in dependence of the relative movement, so that the sensor can acquire hyperspectral image data of the portion of the scene, as the viewpoint moves along a portion of the imaging path.

The image steering arrangement may comprise a mirror rotatably mounted for steering a view of the portion of the scene on the sensor.

The apparatus may further comprise one or more gimbals for mounting the sensor and steering arrangement to the viewpoint, such as an aircraft, to minimise rotational movements of the sensor and steering arrangement with corresponding movements of the viewpoint.

According to a third aspect of the present invention there is provided a computer program element comprising: computer code means to make the computer execute the methods of the first aspect. The element may comprise a computer program product.

According to a fourth aspect of the present invention there is provided apparatus comprising a processor configured to execute a method according to the first aspect.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which.

DETAILED DESCRIPTION

Figure 1:
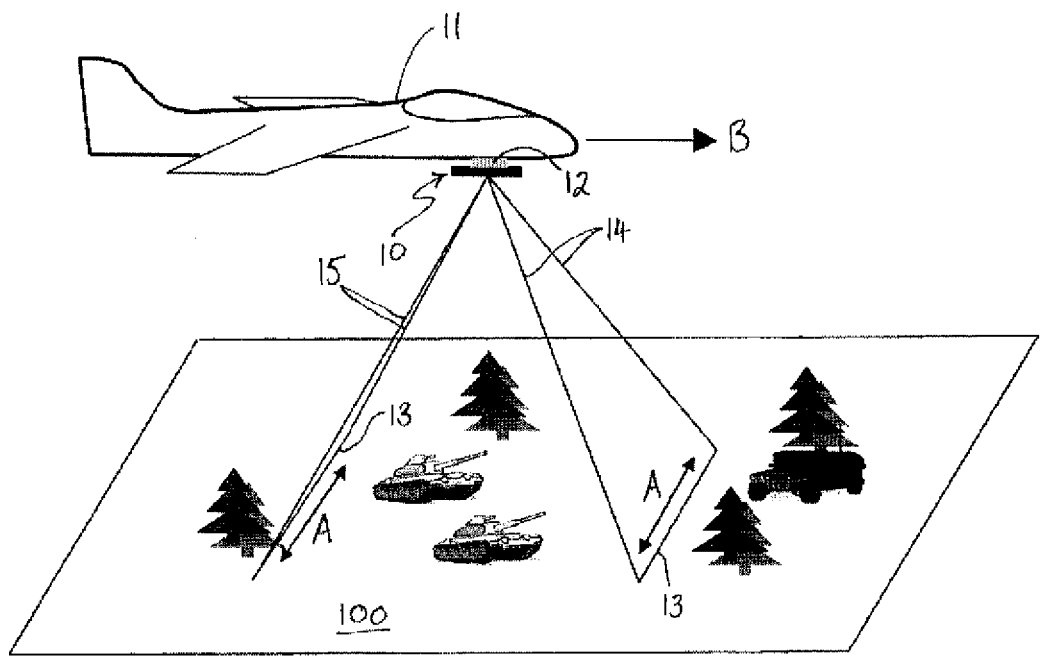
FIG. 1 is a schematic illustration of an aircraft embodying apparatus according to the present invention.
Figure 2:
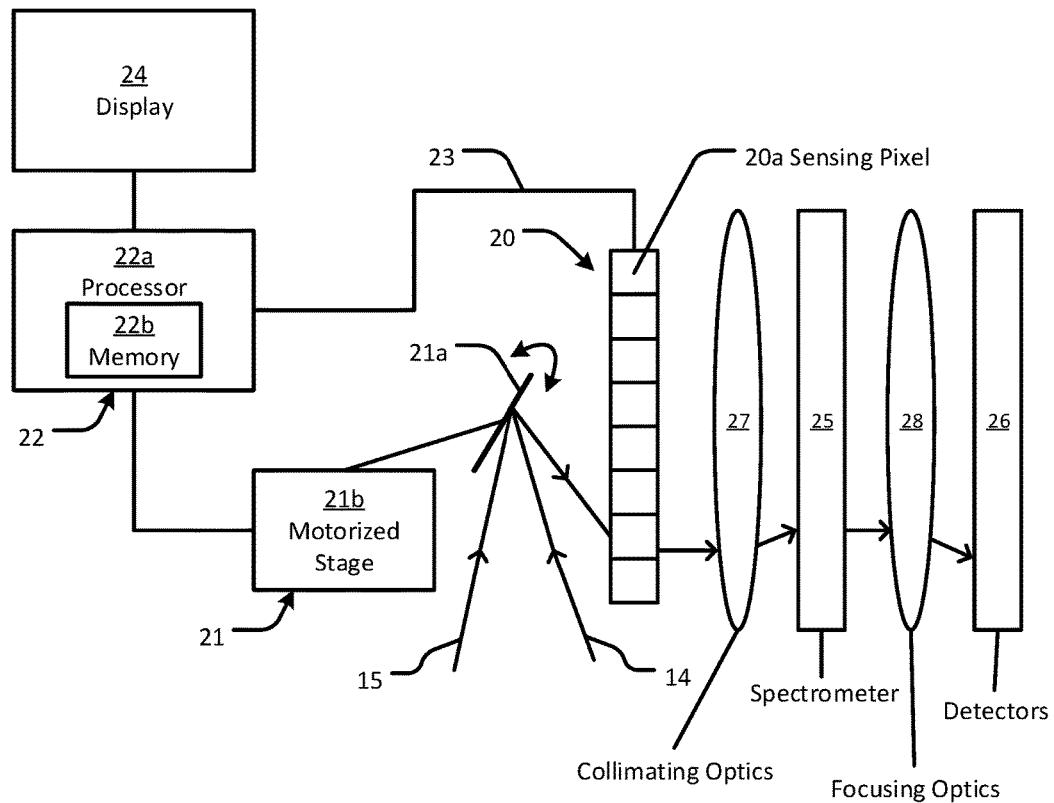
FIG. 2 is a schematic illustration of the hyperspectral sensor.

Referring to FIG. 1 of the drawings, there is illustrated an apparatus 10 according to the present invention mounted at the underside of an aircraft 11. The apparatus 10 comprises a hyperspectral sensor 20 for acquiring hyperspectral image data of a portion of a scene 100 to be imaged, and a steering arrangement 21, as illustrated in FIG. 2 of the drawings. The arrangement 21 may comprise a rotatably mounted mirror 21a and a motorised stage 21b for providing controlled rotations of the mirror 21a so that an image of the portion of the scene 100 can be suitably steered onto the sensor 20. Since the maximum angular velocity of the mirror 13a needs only to be small, of the order of 1 deg/s, it is envisaged that this rotation may be controlled using a digitally controlled stepper motor.

The sensor 20 is in communication with a computing device 22 that is configured to receive hyperspectral image data from the sensor 20 and process it using an application. The computing device 22 can be any suitable computing device 22 having a processor 22a and memory 22b (e.g. a laptop or desktop personal computer) and can communicate with other devices, such as the sensor 20, using any suitable wired or wireless communications link 23, e.g. WiFi™, USB Link, etc.

The device 22 is also connected to, or includes, a display 24, such as an LCD monitor or any other suitable device, which can be used to display representations of the image data and/or other information relating to the results of the data processing. Although the components are shown as separate blocks in FIG. 2, and can be located remotely of each other, it will be understood that in some embodiments, all or some of them could be integrated in a single device, e.g. a portable sensor with an on board processing and/or display.

In order to minimise any blurring of the imaged scene due to aircraft movement and vibration, the apparatus may be mounted to the aircraft via gyroscopically stabilised gimbals 12. However, it is not generally necessary to do this with aerial hyperspectral imagers because their instantaneous field of view is relatively modest.

The hyperspectral image data of the scene 100 is acquired via the hyperspectral sensor 20 which comprises a linear array of sensing pixels 20a. The image data for the entire scene 100 is built up by combining scan lines 13 across the scene, namely the swath direction as indicated by arrow A, as the aircraft 11 moves along the scene 100, namely along the track direction, as indicated by arrow B. The image acquired at each sensing pixel 20a is dispersed using a spectrometer 25 onto a two-dimensional array of detectors 26 via collimating optics 27 and focussing optics 28 and the hyperspectra for each scan line are then stacked to form a three-dimensional hyperspectral data cube (not shown).

Figure 3:
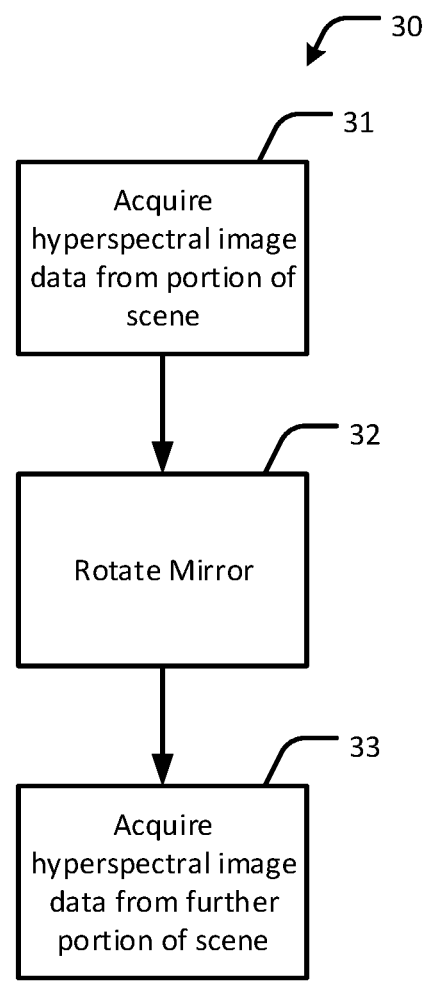
FIG. 3 is a flowchart outlining the steps associated with a method according to the present invention.

Referring to FIG. 3 of the drawings, in use, the aircraft 11 is flown over the scene 30 to be viewed and a portion of the image scene, namely a scan line 13 across the track direction is directed on the hyperspectral sensor 20 via the rotatable mirror 21a to acquire hyperspectral image data at step 31. As the aircraft 11 continues to move in the track direction, the mirror 21a is arranged to rotate from a first viewing direction 14 of the portion relative to the aircraft 11, which may be forwardly of the aircraft 11, to a second viewing direction 15 which may be less forwardly or even rearwardly of the aircraft 11, at step 32. This tracking of the portion of the scene 100 reduces the relative speed between the aircraft 11 and the portion and effectively increases the time spent acquiring the hyperspectral image data from the portion of the scene 100, thereby providing an increased image resolution of the scene portion.

Calculations have been carried out to show that the spatial resolution of aerial hyperspectral images can be improved by up to a factor of ten by tracking the instantaneous field of view backwards during flight. An instantaneous field of view of 0.03 mrad can readily be achieved using commercial 7 μm pixel hyperspectral imager, a 250 mm lens, and a mirror 21a rotating at about 13.5 mrad/s (0.08 deg/s).

Once the rotatable mirror 21a has rotated to the second viewing direction 15 relative to the aircraft 11, the mirror 21a is required to return to the first viewing direction 14 for subsequent acquisition of image data from a further portion of the scene at step 33. During the recovery of the mirror 21a to its original position, the aircraft 11 will continue to move relative to the scene 100 and as such, this will result in portions of the scene being unimaged. In order to provide full pushbroom coverage of the scene 100 at high resolution, it is envisaged that several apparatus 10 according to the present invention may be mounted side by side and arranged to view different portions of the scene 100. By directing each mirror 21a in a slightly different direction, several lines could be scanned forward at the same time by an aircraft 11 travelling at a reasonable speed. In this manner, as one mirror 21a recovers to the original position, namely the first viewing direction 14, following a data acquisition, a further apparatus 10 may be used to acquire data from the portion which would have otherwise gone un-imaged. Calculations show that with four apparatus 10 working in parallel, the ground resolution may be increased by a factor of four without any loss of image pixels.

The invention claimed is:

1. A method for hyperspectral imaging of a scene along an imaging path, from a viewpoint which is arranged to move relative to the scene, the method comprising:

acquiring a first scan line of hyperspectral image data of a portion of the scene from the viewpoint, along a first viewing direction relative to the viewpoint;

redirecting the viewing direction from the first viewing direction to a second viewing direction relative to the viewpoint, in dependence of the relative movement, to maintain a view of the scene as the viewpoint moves along a portion of the imaging path;

acquiring a second scan line of hyperspectral image data of a further portion of the scene along the second viewing direction; and stacking the first and second scan lines of the hyperspectral image data to obtain three-dimensional hyperspectral data, wherein the hyperspectral image data is acquired via a reflecting member, which is arranged to reflect an image of the portion of the scene onto a hyperspectral sensor, and wherein the viewing direction is varied between the first and second viewing directions by rotating the reflecting member between first and second angular orientations, respectively.

2. The method according to claim 1, further comprising redirecting the viewing direction from the second viewing direction back to the first viewing direction, to acquire hyperspectral image data of a different portion of the scene from the viewpoint.

3. An apparatus for hyperspectral imaging of a scene along an imaging path, from a viewpoint which is arranged to move relative to the scene, the apparatus comprising:
a hyperspectral imaging sensor for acquiring hyperspectral image data; and
an image steering arrangement for steering a view of a portion of the scene from a first viewing direction to a second viewing direction relative to the viewpoint, in dependence of the relative movement, so that the sensor can acquire hyperspectral image data of the portion of the scene, as the viewpoint moves along a portion of the imaging path; and
a computing device operatively coupled to the hyperspectral imaging sensor;
wherein the image steering arrangement is configured to
acquire a first scan line of hyperspectral image data of the portion of the scene from the viewpoint, along the first viewing direction relative to the viewpoint;
redirect the viewing direction from the first viewing direction to the second viewing direction relative to the viewpoint, in dependence of the relative movement, to maintain a view of the scene as the viewpoint moves along a portion of the imaging path; and
acquire a second scan line of the hyperspectral image data of a further portion of the scene along the second viewing direction; and
wherein the hyperspectral image data is acquired via a reflecting member, which is arranged to reflect an image of the portion of the scene onto the hyperspectral imaging sensor, and
wherein the viewing direction is varied between the first and second viewing directions by rotating the reflecting member between first and second angular orientations, respectively, and
wherein the computing device is configured to stack the first and second scan lines of the hyperspectral image data to obtain three-dimensional hyperspectral data.

4. The apparatus according to claim 3, wherein the image steering arrangement comprises the reflecting member rotatably mounted for steering a view of the portion of the scene on the hyperspectral imaging sensor.

5. The apparatus according to claim 4, further comprising a gimbal for minimising rotational movements of the sensor and steering arrangement with corresponding movements of the viewpoint.

6. The apparatus according to claim 3, further comprising a gimbal for reducing rotational movements of the hyperspectral imaging sensor and the image steering arrangement with corresponding movements of the viewpoint.

7. The apparatus according to claim 3, further comprising a spectrometer and a two-dimensional array of detectors, wherein the hyperspectral imaging sensor is configured to disperse an image acquired at each pixel thereof onto the two-dimensional array of detectors using the spectrometer.

8. The apparatus according to claim 7, further comprising collimating optics and focusing optics, wherein the collimating optics are positioned between the hyperspectral imaging sensor and the spectrometer, and wherein the focusing optics are positioned between the spectrometer and the two-dimensional array of detectors.

9. A non-transitory computer readable medium encoded with computer code that when executed by one or more processors cause a process to be carried out for hyperspectral imaging of a scene along an imaging path, from a viewpoint which is arranged to move relative to the scene, the process comprising:
acquiring a first scan line of hyperspectral image data of a portion of the scene from the viewpoint, along a first viewing direction relative to the viewpoint;
redirecting the viewing direction from the first viewing direction to a second viewing direction relative to the viewpoint, in dependence of the relative movement, to maintain a view of the scene as the viewpoint moves along a portion of the imaging path;
acquiring a second scan line of hyperspectral image data of a further portion of the scene along the second viewing direction; and
stacking the first and second scan lines of the hyperspectral image data to obtain three-dimensional hyperspectral data,
wherein the hyperspectral image data is acquired via a reflecting member, which is arranged to reflect an image of the portion of the scene onto a hyperspectral sensor, and
wherein the viewing direction is varied between the first and second viewing directions by rotating the reflecting member between first and second angular orientations, respectively.

10. The non-transitory computer readable medium according to claim 9, the process further comprising redirecting the viewing direction from the second viewing direction back to the first viewing direction, to acquire hyperspectral image data of a different portion of the scene from the viewpoint.

11. An apparatus comprising a processor and a memory storing computer code executable by the processor to cause a method according to claim 1 to be carried out,
wherein the hyperspectral image data is acquired via a reflecting member, which is arranged to reflect an image of the portion of the scene onto a hyperspectral sensor, and
wherein the viewing direction is varied between the first and second viewing directions by rotating the reflecting member between first and second angular orientations, respectively.

12. The apparatus according to claim 11, wherein the computer code is further executable by the processor to redirect the viewing direction from the second viewing direction back to the first viewing direction, to acquire hyperspectral image data of a different portion of the scene from the viewpoint.

* * * * *